(12) United States Patent
Neumann et al.

(10) Patent No.: US 8,746,079 B2
(45) Date of Patent: Jun. 10, 2014

(54) MASS FLOW SENSOR AND METHOD FOR DETERMINING THE MASS FLOW IN A PIPE

(75) Inventors: Holger Neumann, Weingarten (DE); Rajini Kumar Ramalingam, Buechig (DE); Manfred Suesser, Bruchsal (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 129 days.

(21) Appl. No.: 13/637,262

(22) PCT Filed: Mar. 17, 2011

(86) PCT No.: PCT/EP2011/001312
§ 371 (c)(1),
(2), (4) Date: Sep. 25, 2012

(87) PCT Pub. No.: WO2011/116899
PCT Pub. Date: Sep. 29, 2011

(65) Prior Publication Data
US 2013/0014594 A1    Jan. 17, 2013

(30) Foreign Application Priority Data
Mar. 26, 2010  (DE) .......................... 10 2010 012 924

(51) Int. Cl.
*G01F 1/34* (2006.01)
(52) U.S. Cl.
USPC ...................................... 73/861.44
(58) Field of Classification Search
USPC ............................ 73/861.44, 861.47, 861.52
See application file for complete search history.

(56) References Cited

U.S. PATENT DOCUMENTS

| | | | |
|---|---|---|---|
| 6,408,698 B1 | 6/2002 | Brereton et al. | |
| 6,426,796 B1 | 7/2002 | Pulliam et al. | |
| 6,854,340 B2 * | 2/2005 | Nestle et al. | 73/861.49 |
| 6,854,341 B2 * | 2/2005 | Oddie et al. | 73/861.52 |
| 8,511,180 B2 * | 8/2013 | Melamed | 73/861.47 |
| 2003/0126921 A1 | 7/2003 | Zisk et al. | |
| 2009/0133505 A1 | 5/2009 | Sheverev et al. | |

FOREIGN PATENT DOCUMENTS

| | | |
|---|---|---|
| DE | 3333920 | 4/1984 |
| DE | 19648403 | 4/1998 |
| DE | 19922102 | 12/2000 |
| EP | 1936332 | 6/2008 |

(Continued)

OTHER PUBLICATIONS

International Search Report of PCT/EP2011/001312 filed Jul. 13, 2011 With an English Translation.

*Primary Examiner* — Jewel V Thompson
(74) *Attorney, Agent, or Firm* — Venable LLP; Robert Kinberg

(57) ABSTRACT

A sensor for determining a mass flow of a fluid in a pipe includes a wall element adapted for insertion into a cutout in a wall of the pipe through which a mass flow can flow, so that at least one gap remains between the wall element and the wall of the pipe, and so that the wall element is positionable on the outside facing away from the mass flow. A sealed chamber is adapted to enclose the wall element on the outside of the pipe. At least one expandable connection is located in the sealed chamber and is clamped in between the wall element and one wall of the chamber. At least one strain gauge comprising a fiber Bragg grating sensor is located on a section of the expandable connection that is clamped in between the wall of the chamber and the wall element.

8 Claims, 1 Drawing Sheet

(56) References Cited

FOREIGN PATENT DOCUMENTS

| GB | 2454613 | 5/2009 |
| JP | 2005003535 A | 1/2005 |
| JP | 2007017337 A | 1/2007 |

\* cited by examiner

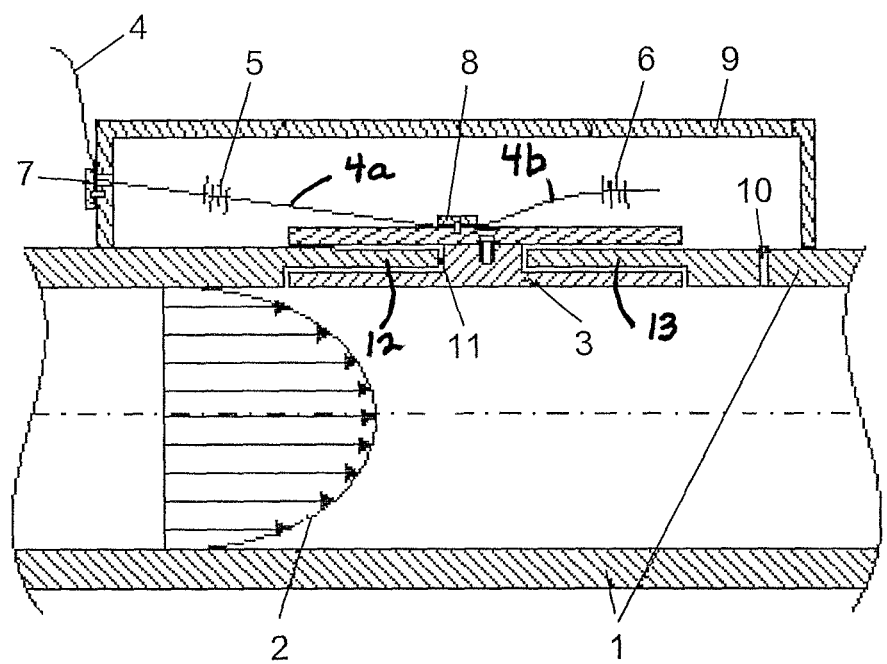

MASS FLOW SENSOR AND METHOD FOR DETERMINING THE MASS FLOW IN A PIPE

CROSS-REFERENCE TO RELATED APPLICATION

This application is a National Stage application of International Application No. PCT/EP2011/001312, filed Mar. 17, 2011, which claims the priority benefit of German Application No. 10 2010 012 924.0, filed on Mar. 26, 2010.

BACKGROUND OF THE INVENTION

The invention relates to a sensor for determining the mass flow of a fluid (mass flow sensor), to a pipe provided with a mass flow sensor of this type, as well as to a method for determining the mass flow of a fluid in a pipe.

Conventional mass flow sensors for determining the mass flow of a fluid, meaning a liquid or a gas, on the one hand are based on a use of differential pressure methods which, however, cause a lasting pressure loss in the flow as a result of the measuring operation and, on the other hand, are based on electronic methods which are influenced considerably by strong electromagnetic fields in the area surrounding the sensor, thereby resulting in high measuring errors or in a considerable calibration expenditure. Different types of mass flow sensors have therefore already been proposed which are provided with a fiber Bragg grating sensor (FBG sensor) that permits a precise determination of the change in the length of a glass fiber strand.

Japanese Patent JP 2005003535 A discloses an optical device for determining the direction and/or the speed of a flow, which is based on an element with a thereon mounted glass fiber and an FBG sensor being deformed by the hydraulic pressure. The disadvantage of this arrangement is that a noticeable hydraulic pressure is generated only in a liquid, so that the device is not suitable for use with gas flows. The device furthermore requires a deformable element which is an essential disadvantage, in particular with extreme changes in temperature during which the material characteristics of this element can change considerably, as well as at low temperatures since practically no deformable materials exist, which can be used at these temperatures.

A flow sensor is also known from the document European Patent Application EP 1936332 A1 for which a flow element is introduced into the flow to detect the Kámán vortices with the aid of FBG sensors. This sensor has the disadvantage of being located in the flow, thereby resulting in a higher pressure loss as compared to an unobstructed pipe and/or conduit flow. A further disadvantage is that the sensor detects the flow-characteristic Kámán vortices with the aid of a FBG sensor. As a result, it is impossible to determine whether the length change in the flow meter occurs as a result of the change in the flow resistance or only as a result of a temperature change.

Japanese Patent JP 2007017337 A describes a device for determining flow speed on the basis of measuring a dynamic pressure that is exerted onto a wall element, wherein the FBG sensor is located inside an airtight chamber. The disadvantage of this arrangement is that a flow must be directed toward the measuring arrangement, so that it is not suitable for measuring an inside flow and thus is not suitable without problems as a mass flow sensor. The installation inside a pipe would result in considerable pressure loss. Since the sensor is located inside an air-tight chamber, the temperature correction only relates to the temperature-dependent length expansion or elongation of the glass fiber.

British Patent GB 2454613 A discloses a glass fiber with at least one FBG sensor which is inserted into the flow. To increase the signal strength, one or several flow-shaped elements, in particular spheres or ellipsoids, are fixedly connected to the glass fiber. When using several elements to reinforce the mechanical load on the glass fiber, the device represents a type of pearl necklace which is inserted into the flow. The disadvantage of this arrangement is that the reinforced glass fiber must be inserted into the flow, thereby causing an additional pressure loss. In contrast to a liquid flow, a gas flow requires an increase in the number of flow-shaped elements and in the size of the elements, thereby further increasing the pressure loss, wherein it is an additional disadvantage that no distinction can again be made to determine whether the glass fiber expansion is due to the change in the flow resistance or to a temperature change.

U.S. Pat. No. 6,408,698 B1 discloses an electronic sensor which is inserted into the wall and detects the forces resulting from the flow via expandable connections, using an electronic sensor. This arrangement has the disadvantage that the signal changes as a result of electromagnetic fields, wherein this requires a calibration of the sensor in the magnetic field with respect to size and orientation of the sensor relative to the magnetic field. Each individual sensor in this case must be calibrated for its respective use in order to take into consideration production tolerances. In particular when using the sensors in the presence of cryogenic temperatures having magnetic fields impressed from the outside, the calibration expenditure is considerable.

US Patent Publication No. 2009/0133505 A1 describes a device for which the wall shearing stress causes the bending of a rod which, in turn, compresses a micro-resonator. The change in the wave length caused by the mechanical stress exerted on the micro-resonator is then measured. The bending of the rod as well as the mechanical stress and thus the measuring signal depend on the temperature-dependent material values of the rod and the micro-resonator. A disadvantage in this case is that the mechanical stress on the rod depends on the temperature as well as on the purity and structure of the material: impurities or occlusions as well as voids influence the ductility of the rod. The same is correspondingly also true for the micro-sensor, so that each mass flow sensor represents a unique device to be calibrated for temperature and load. Furthermore, owing to the fact that micro-resonators are not sufficiently reproducible, as well as the production of the technically demanding connection between the micro-resonator and the glass fiber, each sensor is a unique device to be calibrated separately. The size of the micro-resonator is furthermore critical with respect to the signal quality. Finally, the bending of the rod not only results in mechanical stress exerted on the micro-sensor, but also leads to a displacement in flow direction, thereby considerably influencing the signal. The reversibility of the movement and taking this into consideration within the framework of a calibration are therefore not necessarily ensured, wherein this also detrimentally affects the permanent functionality of the sensor.

U.S. Pat. Nos. 7,168,311 B2 and 6,426,796 B1 respectively disclose a sensor installed in a wall for detecting forces resulting from a flow via the bending of a rod and with the aid of an optical sensor and interferometry. The disadvantage of these arrangements is that the mechanical stress for bending the rod again depends on the temperature as well as on the purity and structure of the material. The interferometry measurement is based on the beam being transmitted to a plate and that the reflected beam interferes with the transmitted beam, wherein the plate is connected to the rod which is bent as a result of the wall shearing stress. Owing to the bending of the rod, the plate which absorbs the wall shearing stress does not move parallel to the flow direction, but is positioned transverse thereto. A beam impinging on the underside of this plate in that case is no longer reflected normally (180°), but at an angle that deviates from 180°. Since this behavior can be ignored only within an extremely small angular region, it considerably reduces the area of application for the device in flows. Configuring the device in this way furthermore poses maximum requirements with respect to production tolerances.

SUMMARY OF THE INVENTION

Starting with this premise, it is an object of the present invention to provide a sensor for determining the mass flow of a fluid (mass flow sensor), a pipe equipped with such a mass flow sensor, as well as a method for determining the mass flow of a fluid in a pipe which are not subject to the aforementioned disadvantages and restrictions.

A further object is to provide a mass flow sensor which operates reliably in the area surrounding strong electro-magnetic fields, which is suitable for use with gases as well as liquids, and which can also be used at extremely low temperatures, especially in the field of cryogenic technology, wherein this sensor need not be inserted into the mass flow, thereby avoiding a pressure loss occurring in the flow.

The purity or the structure of the material selected for the actual detection element in the mass flow sensor should also not play a role, so that a prototype can be calibrated once and this calibration can subsequently be used for any identically configured sensor.

It is furthermore an object to provide a pipe, a section of a pipe, a conduit or a section of a conduit equipped with a mass flow sensor of this type which may be installation with the aid of flanges in a pipe system or a conduit system.

Finally, a method is to be made available for determining the mass flow of a fluid in a pipe for which a change in the length of a glass fiber can always be clearly traced back to the change in a flow-mechanical characteristic of the mass flow and which allows subtracting out any length changes caused by a temperature change in the mass flow or the surrounding area.

The above and other objections are accomplished according to an embodiment of the invention, wherein there is provided a sensor for determining a mass flow of a fluid in a pipe, comprising: a wall element adapted for insertion into a cutout in a wall of the pipe through which a mass flow can flow so that at least one gap remains between the wall element and the wall of the pipe, and so that the wall element is positionable on the outside facing away from the mass flow; a sealed chamber adapted to enclose the wall element on the outside of the pipe; at least one expandable connection located in the sealed chamber and being clamped in between the wall element and one wall of the chamber; and at least one strain gauge comprising a fiber Bragg grating (FBG) sensor located on a section of the expandable connection that is clamped in between the wall of the chamber and the wall element A sensor according to the invention for determining the mass flow of a fluid (mass flow sensor) comprises a movable wall element which can be inserted (integrated) into a cutout in the wall of a pipe or conduit through which a mass flow flows. The movability of the wall element is ensured by one or several gaps existing between the wall element and the wall of the pipe into which the wall element is inserted or integrated.

On the outside of the movable wall element that is facing away from the mass flow, at least one expandable connection is installed inside a chamber sealed against the environment. A connection is considered expandable if the shearing force acting upon it causes a measurable expansion or elongation, wherein the material used in practical operations should not become brittle or tear. Rubber, for example, is not suitable for use with cryogenic temperatures as a result of this requirement.

The at least one existing expandable connection is attached to the wall element as well as to one chamber wall and is clamped in between the two fastening points. The at least one expandable connection is preferably attached with the aid of a first clamping device to a chamber wall and with the aid of a second clamping device to the movable wall element, wherein it is respectively clamped in with low initial stress between the wall element and the chamber wall. At least one strain gauge is respectively attached to that section of the at least one expandable connection which is clamped in between the chamber wall and the movable wall element.

According to one embodiment, several expandable connections are provided which respectively comprise at least one strain gauge and are attached with a first, separate tensioning device to one chamber wall. In this way, the sensor functions independent of the direction of the mass flow.

On each of the at least one expandable connections, at least one strain gauge is attached to or mounted on that section of the expandable connection which is clamped in between the chamber wall and the wall element.

According to another embodiment, at least one temperature sensor is provided which is attached to a section of the expandable connection that is not clamped in between the chamber wall and the wall element. Since this additional section of the expandable connection is not affected by the change in length caused in the glass fiber section that is clamped in between the chamber wall and the wall element as a result of the shearing stress of the fluid in the mass flow, it is possible to provide at least one additional strain gauge functioning as the at least one temperature sensor to determine the temperature in the closed chamber via the length change in this section of the expandable connection.

According to the invention, at least one glass fiber is used as the expandable connection, at least one fiber Bragg grating sensor (FBG sensor) is provided as strain gauge and is attached to or is mounted on the at least one glass fiber. According to another embodiment, at least one additional FBG sensor is installed as a temperature sensor on the section of the glass fiber which is not clamped in between the chamber wall and the wall element. Optical interference filters which are written into a waveguide in such a way that wavelengths contained within a filter band width are reflected are referred to as fiber Bragg gratings. These gratings consequently can be used as sensors for measuring the expansion as well as the temperature, respectively, based on a change in the reflected wavelength.

In addition to the one or several gaps existing between the wall element and the pipe wall into which the wall element is inserted or integrated, the pipe according to one embodiment also contains one or several openings (bore holes) which connect the pipe inside with the chamber. A share of the mass flow enters from the pipe into the chamber through the at least one gap and/or the at least one opening, thus ensuring that the same temperature as in the mass flow is also present in the chamber. The accuracy of the temperature measurement is clearly increased in this way.

The invention furthermore relates to a pipe, wherein it is understood to relate also to a pipe section, a conduit or a conduit section provided with a mass flow sensor as defined for the invention.

According to a further embodiment, the pipe comprises an installation mechanism including flanges in a pipe system or a conduit system.

Finally, the invention also relates to a method for determining the mass flow inside a pipe. For this, a mass flow of a fluid flows through the pipe and exerts a shearing stress onto the movable wall element, wherein the strength of this shearing stress is proportional to the volume of the mass flow. The shearing stress causes a change in the length of the one or several expandable connections, meaning the one or several glass fibers, which are clamped in between the outside of the wall element that is facing away from the mass flow and one chamber wall. The change in length of the expandable connection is respectively detected with at least one FBG sensor which is attached to or mounted on the respective expandable connection. Following a calibration, the volume of the mass flow can be determined in this way.

According to another embodiment, a small share of the mass flow enters the chamber through the at least one gap between the wall element and the pipe wall and, insofar as present, through at least one additional opening in the pipe. As a result, it is ensured that the chamber has the same temperature as the mass flow, so that the temperature of the mass flow can be determined with a temperature sensor. The change in length of an additional section of at least one glass fiber which is not clamped in between a chamber wall and the wall element is preferably determined for this with the aid of a thereon installed strain gauge in the form of a FBG sensor. In this way it is possible to subtract out a share of the length change in one or several of the expandable connections, meaning glass fibers, caused by a temperature change and not caused by the effect of the shearing stress.

The mass flow sensor according to the invention is not dependent on the amount of hydraulic pressure, thus making it possible to determine the mass flow in liquid flows as well as in gas flows.

With the mass flow sensor according to the invention, no additional pressure loss is incurred as compared to a regular pipe flow and/or a conduit flow since the movable wall element which absorbs the shearing stress of the flow is inserted into the wall of the pipe or the pipe section. The mass flow sensor according to the invention avoids pressure losses by avoiding the installation of any device which could result in additional loss of pressure as compared to an unobstructed pipe flow and/or conduit flow. According to the invention, the movable wall element is instead moved only by the wall shearing stress which occurs in any case in the pipe and/or conduit. Consequently, the shearing stress and not the compression force is the actual input variable in this case for determining the volume of the mass flow.

An embodiment of the mass flow sensor according to the invention provides information on whether the change in the glass fiber length is actually caused by the change in the flow resistance of the mass flow to be examined and not as a result of a temperature change. This information is obtained by determining only the temperature with the aid of an additional FBG sensor. As a result, the absolute flow temperature of the mass flow is measured in on the one hand while, on the other hand, the change in length caused by the temperature influence is also clearly determined, thus making the measuring results considerably more accurate.

One embodiment of the mass flow sensor according to the invention calls for the strain gauges to be directly exposed to the flow temperature via the gaps and/or openings, so as to result not only in a correction of the temperature-dependent length expansion of the glass fiber, but also to provide a correct measurement of the absolute temperature. The measurement of the absolute temperature is necessary for determining the density of the fluid which is required for determining the volume of the mass flow.

Finally, the mass flow sensor according to the invention does not depend on the characteristics of the materials used for the sensor.

The invention is explained in further detail in the following with the aid of an exemplary embodiment and the single FIGURE.

BRIEF DESCRIPTION OF THE DRAWINGS

FIG. 1 illustrates an embodiment of a mass flow sensor in a pipe section according to the invention.

DETAILED DESCRIPTION

The single FIGURE shows a pipe 1 section through which a mass flow 2 of a fluid flows, meaning a gas or a liquid. A movable wall element 3, comprising an inside that faces the mass flow 2 and an outside facing away from the mass flow 2, is located in one section of the pipe 1 wall. Attached to the outside of the movable wall element 3, in a chamber 9 that is sealed against the environment, is a glass fiber functioning as expandable connection 4 which contains a first fiber Bragg grating as strain gauge 5 as well as a second fiber Bragg grating functioning as temperature sensor 6. With low pre-stressing, the glass fiber expandable connection 4 is attached with the aid of a first clamping device 7 to one wall of the chamber 9 and with the aid of a second clamping device 8 to the movable wall element 3. The first fiber Bragg grating functioning as the strain gauge 5 is mounted on the section of the glass fiber that functions as expandable connection 4 and is located between the first clamping device 7 and the second clamping device 8. The second fiber Bragg grating functioning as a temperature sensor 6 is attached to a section of the glass fiber expandable connection 4 which is not clamped in.

A small share of the mass flow 2 flows through the gap 11 between the movable wall element 3 and the remaining wall of the pipe 1 and, if applicable, also through additional bore holes 10 in the pipe 1 into the sealed chamber 9, so that this chamber has the same temperature as the mass flow 2. As a result, the temperature of the mass flow 2 can be determined via a length change in the respective section of the glass fiber expandable connection 4, using the second fiber Bragg grating functioning as a temperature sensor 6.

As a result of the temperature change, the first fiber Bragg grating that functions as a strain gauge 5 experiences a change in its length (contraction or dilatation) which depends on the mass flow 2 temperature and/or on the pulling force exerted by the wall element 3 onto the glass fiber forming the expandable connection 4. The pulling force is generated by the shearing stress (wall friction) exerted by the fluid of the mass flow 2 onto the movable wall element 3. The shearing stress exerted by the fluid onto the wall is proportionally dependent on the mass flow 2. The change in the length of the first fiber Bragg grating functioning as a strain gauge 5, which is the result of thermal contraction and/or thermal dilatation, can be determined by using the temperature value determined with the aid of the fiber Bragg grating that functions as temperature sensor 6, thus making it finally possible to clearly determine the pulling force and, via the amount of shearing stress, also the volume of the mass flow.

The mass flow sensor according to the invention was configured and then installed in a pipe with the aid of flanges. A nitrogen flow was generated using a compressed gas cylinder. The change in the gas flow, generated in this way, caused a change in the wavelength of the light scattered back from the fiber Bragg grating. Assigning this change in the measured wavelength to the specific mass flow to be determined is based on a calibration still to be made. With known values for the fluid, temperature and pressure, the viscosity can be determined easily by one skilled in the art using a material database, so that the calibration must be made only once later on. Given a known value for the pre-stressing of the glass fiber, a sensor can later on use this known calibration and need not be calibrated again

The invention claimed is:

1. A sensor for determining a mass flow of a fluid in a pipe, comprising:
   a wall element adapted for insertion into a cutout in a wall of the pipe through which a mass flow can flow so that at least one gap remains between the wall element and the wall of the pipe, and so that the wall element is positionable facing an outside of the pipe away from the mass flow;
   a sealed chamber adapted to enclose the wall element on the outside of the pipe;
   at least one expandable connection located in the sealed chamber and being clamped between the wall element and one wall of the chamber; and
   at least one strain gauge comprising a fiber Bragg grating (FBG) sensor located on a section of the expandable connection that is clamped between the wall of the chamber and the wall element.

2. The mass flow sensor according to claim 1, further comprising at least one temperature sensor including at least one additional FBG sensor, attached to an additional section of the expandable connection that is not clamped between the wall of the chamber and the wall element.

3. The mass flow sensor according to claim 1, further comprising a plurality of expandable connections which respectively comprise at least one strain gauge and which are respectively attached with a separate first clamping device to a wall of the chamber.

4. A pipe having a wall with a cutout with a mass flow sensor as defined in claim 1 disposed in the cutout.

5. The pipe according to claim 4, wherein the wall of the pipe includes at least one additional opening for connecting the inside of the pipe to the chamber.

6. The pipe according to claim 4, wherein the wall of the pipe includes flanges to accommodate installation of the FBG sensor.

7. A method for determining a mass flow of a fluid in a pipe, comprising:
   installing a movable wall element in a cutout of a wall of the pipe so that a gap remains between the wall element and the wall of the pipe;
   enclosing the wall element in a sealed chamber located on an outside of the wall of the pipe;
   clamping at least one section of a glass fiber functioning as at least one expandable connection between an outside of the wall element facing away from the mass in the pipe and one wall of the sealed chamber;
   attaching at least one Bragg grating (FBG) sensor functioning as a strain gauge to the expandable connection;
   flowing a mass flow of a fluid through the pipe, wherein the mass flow of fluid exerts a shearing stress onto the movable wall element, wherein the shearing stress is dependent on a volume of the mass flow, thereby causing a change in a length of the at least one expandable section; and
   detecting a change in length of the at least one expandable connection; and
   determining the mass flow volume from the change.

8. The method according to claim 7, further comprising; flowing a share of the mass flow through the at least one gap between the wall element and the wall of the pipe and through at least one additional opening in the pipe into the sealed chamber, thereby ensuring that the same temperature is present in the chamber as in the mass flow; and determining the mass flow temperature with aid of an additional FBG sensor functioning as a temperature sensor which is attached to an additional section of the at least one expandable connection that is not clamped between the wall of the chamber and the wall element, thus making it possible to subtract out a share of the length change in the expandable connection which is caused by a temperature change.

* * * * *